United States Patent [19]

Houghton

[11] Patent Number: 4,760,908
[45] Date of Patent: Aug. 2, 1988

[54] SORTER CONVEYOR

[75] Inventor: Harry E. Houghton, Orland Park, Ill.

[73] Assignee: Automotion Incorporated, Alsip, Ill.

[21] Appl. No.: 98,765

[22] Filed: Sep. 17, 1987

Related U.S. Application Data

[63] Continuation of Ser. No. 834,640, Feb. 28, 1986, abandoned.

[51] Int. Cl.⁴ .............................................. B65G 47/46
[52] U.S. Cl. .................................. 198/365; 198/366; 198/370; 198/372; 198/457; 198/477.1
[58] Field of Search ............... 198/365, 366, 370, 372, 198/456, 457, 477.1, 482.1, 449, 740, 748, 747, 843, 848

[56] References Cited

U.S. PATENT DOCUMENTS

| | | | |
|---|---|---|---|
| 2,491,974 | 12/1949 | Hansen | 198/843 X |
| 3,361,247 | 1/1968 | Lauzon et al. | 198/370 X |
| 3,367,477 | 2/1968 | Leth | 198/456 X |
| 3,770,100 | 11/1973 | McCaul | 198/372 |
| 4,227,422 | 10/1980 | Kawashima et al. | 198/843 X |
| 4,319,676 | 3/1982 | Turnbough | 198/449 |

Primary Examiner—Robert J. Spar
Assistant Examiner—D. Glenn Dayoan
Attorney, Agent, or Firm—Wood, Dalton, Phillips, Mason & Rowe

[57] ABSTRACT

An improved conveyor system having elongate conveying tubes travelling in pairs in an endless path. The invention contemplates the provision of a slider in each of the tubes in the pair, interconnection of the sliders through a support and the provision of an article engaging pusher surface upon the support and situated above the tube pairs. The sliders are guided in slots extending lengthwise of the tube pairs and are shifted by an associated roller moving in a channel that is shaped depending on the desired shifting of the pushers.

19 Claims, 2 Drawing Sheets

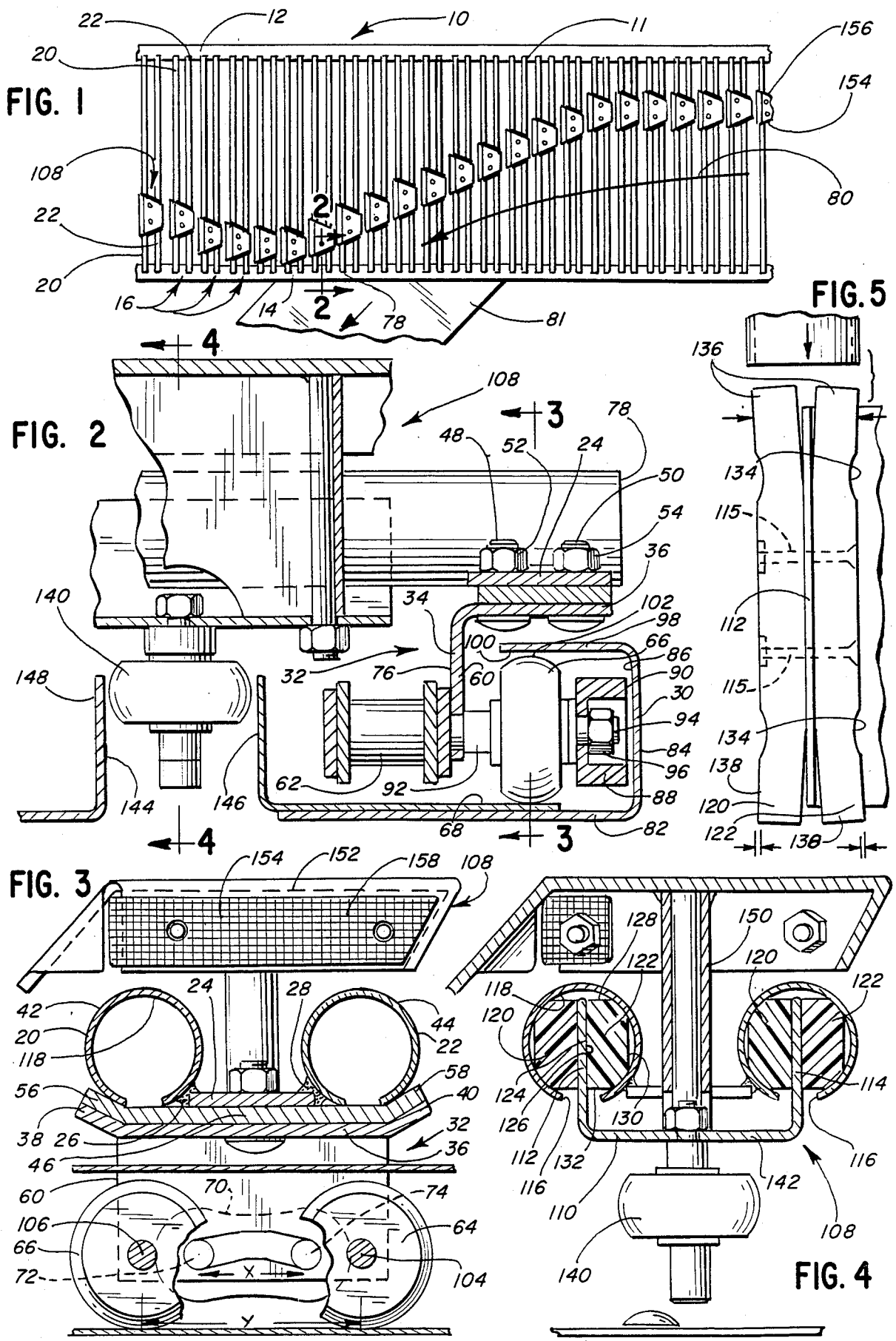

SORTER CONVEYOR

This application is a continuation of application Ser. No. 834,640, filed 2/28/86, now abandoned.

BACKGROUND OF THE INVENTION

1. Field of the Invention

This invention relates to article conveyors and, more particularly, to conveyors with movable pushers for diverting articles away from a principal conveying direction.

2. Background Art

A conventional conveyor construction employs article carrying tubes that are arranged in pairs for movement in an endless path. It is known to cause the conveyed articles to travel in other than the principal conveying direction as the conveyor operates.

In Turnbough (U.S. Pat. No. 4,319,676), articles from multiple feeding conveyors are converged toward a single discharge conveyor. To accomplish this end, pushers are mounted movably relative to the tube pairs, guided by tracks in predetermined paths transversely to the principal conveying direction as the tubes advance and engage and divert the moving articles.

The pushers in Turnbough comprise cooperating members that are bolted together around the tubes for sliding movement lengthwise relative to the tubes. If the cooperating pusher members are drawn too tightly against the tubes, the pushers bind and might jam the entire conveyor. If the pusher members are too loose in relationship to the tubes, unwanted play occurs.

There is also a tendency of the tubes in each pair in Turnbough to skew relative to each other as the conveyor operates. If this occurs, movement of the pusher members lengthwise of the tubes might be impaired.

It is a further drawback with the Turnbough structure that the upper pusher members are guided directly against the upper surfaces of the tubes. The upper surfaces of the tubes are directly contacted by the articles during conveyance and may therefore be subject to wear. This may adversely affect the ability of the upper pusher members to slide freely over the tube surfaces. Liquid spill on the tubes can make the upper tube surfaces sticky and might also impair sliding of the pushers.

A further problem with prior art systems is that structure used to move the article carrying tubes often resides outside the extremities of the tubes. For example, it is conventional to have a drive chain outside the ends of the carrying tubes. As the articles are directed laterally off of the principal conveyor, they may encounter interference from the chain. Repeated contact with the chain by the articles might damage the chain or cause accumulation of foreign matter that might impair its operation.

A further problem with prior art structures such as Turnbough's is that the guide tracks are discontinuous resulting in the pushers being unsupported as they travel the curved path about the conveyor end supports. The unsupported pushers tend to rattle.

SUMMARY OF THE INVENTION

The present invention is specifically directed to overcoming the above enumerated problems in a novel and simple manner.

According to the invention, a slider is provided inside each of the tubes of the tube pairs on a conveyor and is guidingly slidable within the tube. A support interconnects the sliders in each tube pair and carries a pusher having an article engaging surface above the tubes. The support has an associated actuator that cooperates with a rail to guide the pusher transversely to the principal conveying direction.

At least one slider is provided in each tube. Arcs and/or flats are provided on the surfaces of the sliders to define a space within which the foreign matter can accumulate. The arcs and flats reduce friction between the tubes and sliders and permit slight deformation of the tubes without jamming of the sliders. In a preferred form, each slider has a deflectable portion. The deflectable portion is deformed slightly to permit entry of the slider into the tube hollow. The deflectable portion biasably bears against the inside surface of the tube to smoothly and consistently guide the slider.

The invention also contemplates interconnection of the tubes in each tube pair to maintain proper alignment of the tubes for smooth guiding of the pusher members.

Another aspect of the invention is the location of the drive chain for the tube pairs below and between the extremities of the tubes. This prevents undesired contact between the articles and the chain as the articles depart the principal conveyor.

A still further aspect of the invention is the provision of structure to prevent rattling of the pushers as they travel unsupported by the guide rail. A drum is associated with each end support. The drum has a peripheral, resilient surface that bears against the unsupported pushers to prevent their rattling.

Other objects and advantages of the invention will be apparent upon reading the following detailed description taken in conjunction with the drawings and the appended claims.

BRIEF DESCRIPTION OF THE DRAWINGS

FIG. 1 is a plan view of a section of a conveyor system utilizing cooperating pairs of article carrying tubes with pushers according to the invention;

FIG. 2 is an enlarged, sectional view of a tube pair and pusher along line 2—2 of FIG. 1;

FIG. 3 is an enlarged, sectional view of the tube pair and pusher along line 3—3 of FIG. 2;

FIG. 4 is an enlarged, sectional view of the tube pair and pusher along line 4—4 of FIG. 2;

FIG. 5 is an enlarged, plan view of a slider associated with one of the pushers;

DETAILED DESCRIPTION OF THE DRAWINGS

Figure 6:
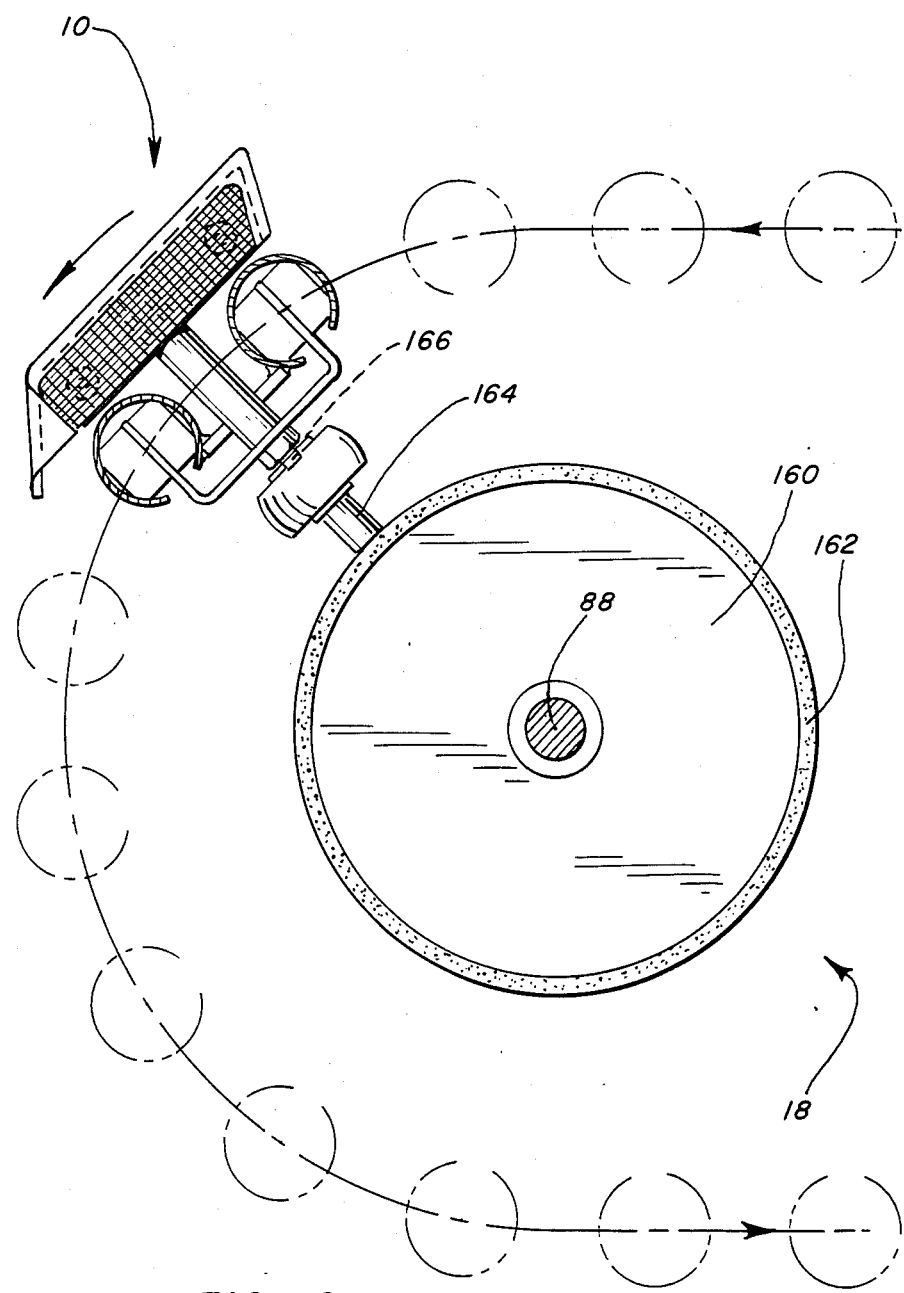
FIG. 6 is an enlarged, side elevation view of an end support on the conveyor of FIG. 1.

A conveyor system with the present invention incorporated is shown at 10 in FIGS. 1 and 6. The conveyor system has a principal conveyor 11 with laterally spaced frames 12, 14 which support and guide a plurality of tube pairs 16 in an endless path around spaced end supports at 18 (one shown in FIG. 6). Each tube pair comprises elongate cylindrical tubes 20, 22. As seen clearly in FIGS. 2 and 3, the tubes 20, 22 in each pair are rigidly interconnected at each of their ends, adjacent the frame members 12, 14, with a flat plate 24, only one of which is shown, as by welds 26, 28.

The tube pairs are supported and guided through the endless path by spaced channels 30 on the frame members 12, 14, which channels cooperate with guide structure shown generally at 32 at each end of the tube pairs. The guide structure 32 which is the same at each end of the tube pairs, comprises an "L" shaped bracket 34. The horizontal leg 36 of each bracket 34 spans the distance between the tubes 20, 22 of the tube pair 16. Spaced ends 38, 40 of the leg 36 are upturned to conform to the outer peripheral surfaces 42, 44 of tubes 20, 22 respectively. A resilient mat 46, preferably formed of reinforced rubber, is interposed between the underside of plate 24 and horizontal leg 36 of the bracket 34. The bracket 34 is drawn upwardly against the plate 24 and associated tubes 20, 22 through bolts 48, 50 with associated nuts 52, 54. Drawing the bracket leg 36 upwardly compresses the mat 46 and conforms the ends 56, 58 thereof about the outer peripheral tube surfaces 42, 44. The resilient mat permits a modicum of relative movement between the tube pair 18 and the bracket 34 and minimizes the likelihood of jamming as the tube pairs move in their prescribed path.

The depending leg 60 of each "L" shaped bracket 34 supports on its inboard side an endless chain 62 arranged in a closed loop and on its outboard side a pair of rollers 64, 66, which roll against an upwardly facing surface 68 of the endless channel 30. The chain links 70 are each supported in conventional manner by a pair of posts 72, 74 projecting horizontally from the inside surface 76 of the depending leg 60 of the bracket. Each chain 62 resides preferably several inches inside of the free edges 78 of the tubes 20, 22 and the chain loops are preferably parallel to each other. As articles are diverted in the path indicated by arrow 80 from the principal conveyor to a secondary conveyor 81 or unloading area, no interference can occur between the articles and the chain 62.

The channel 30 has a "U" shape in cross-section with the bottom leg 82 supporting the rollers 64, 66. The base 84 of the "U" has an inwardly facing surface 86, which confines lateral shifting of the tube pairs. A cylindrical thrust control member 88 has an outwardly facing annular rim 90 which is abuttable with the inside surface 86. The thrust control member 88 is preferably secured on at least one of the shafts 92 on which the wheels 64, 66 rotate. The shaft 92 extends sufficiently through the wheel and has a threaded free end 94 to accept the member 88 and a nut 96 which secures the connection. The upper leg 98 of the "U" is substantially horizontally oriented and has a downwardly facing surface 100 spaced slightly above the outer peripheral edge 102 of the wheel 64, 66 and confines upward shifting of the tube pairs.

The rotational axes 104, 106 of the roller 64, 66 are spaced greater than the pitch of the chain 62. This accounts for smooth movement of the tube pairs around the path. Similarly, the tubes in each pair 16 are on centers spaced greater than the chain pitch.

To divert articles as shown by the arrow 80 in FIG. 1, a pusher at 108 (FIGS. 1–4) is associated with each tube pair. The pushers cooperate with the tubes 20, 22 for guided movement lengthwise thereof. Each pusher comprises a "U" shaped bracket 110 with upwardly opening legs 112, 114. Each leg 112, 114 projects upwardly through an elongate slot 116 in the bottom of the tubes and into the tube hollow defined by a cylindrical inside surface 118. To each leg 112, 114, a pair of slider parts 120, 122 is attached.

The details of the slider are shown clearly in FIGS. 4 and 5. Preferably, each slider part is made from a flexible material and preferably hard plastic. In cross-section, a representative slider part 122 (FIGS. 2–5) has a flat face 124 which seats against a surface 126 of the bracket leg 112. The part 122 is roughly matched to the curvature of the inside surface 118. Flats 128, 130, 132 are provided at the top, middle, and bottom of the slider part. Additionally, at least one arc 134 is defined in the outer peripheral surface of the part 122. The flats and arcs define spaces between the slider parts and inside tube surfaces. In these spaces, foreign matter can accumulate without impairing sliding movement of the sliders within the tubes. Also, in the event that the tubes are slightly dented or damaged in the vicinity of the spaces, movement of the slider will not be impaired.

Preferably, at least one slider part is provided on each side of the bracket legs 112, 114 and the slider parts are drawn towards each other and against the bracket legs through bolts 115. The structure is operable with a single slider on either side of the leg or with more than one slider on one or both sides of the legs.

Preferably, each slider part 120, 122 is formed so that its ends 136, 138 bow slightly. As can be seen in FIG. 5, the ends of the sliders on opposite sides of the leg 112 bow radially oppositely. To insert the slider into the tube hollow, the ends 136 must be slightly deformed towards each other. There are residual forces in the assembled slider part that bear them biasably against the inside surface 118 of the tubes. This assures that the sliders are smoothly and consistently guided relative to the tubes.

A guide roller 140 is bolted to the base 142 of each bracket 110. The roller 140 cooperates with a guide channel 144 defined cooperatively by "L" shaped brackets 146, 148. The guide roller 140 moves within the guide channel and, as the conveyor operates, is moved laterally in a path determined by the configuration of the channel. The channel in FIG. 1 extends diagonally of the conveyor length. FIG. 1 demonstrates one possible path the pushers will take to divert articles off the main conveyor.

Preferably, one channel extends horizontally along the upper conveyor surface and a separate lower channel intercepts and diverts the pushers on the return travel of the tubes to align the pushers for re-entry into the upper channel.

The articles to be diverted are supported on the top surfaces of the tubes 20, 22. Supported on an upright column 150 anchored on the bracket 110 is an article engaging member 152 with oppositely facing article engaging surfaces 154, 156, which are located above the tubes 20, 22. In the conveyor system in FIG. 1 the surfaces 154 are angled and the guide channel 144 is configured so that the article engaging surfaces 154, upon approaching the secondary conveyor 80 align in substantially a straight line to cooperatively establish substantial contact area between the articles and pushers. Preferably, the surfaces 154, 156 are covered with a high friction material 158 to positively grip the articles. Preferably rubber is used and will also protect the conveying articles.

In conventional structures, the pushers are unsupported as they travel around the end supports 18. Another aspect of the invention is the provision of structure to prevent rattling of the unsupported pushers. According to the invention, a drum 160 is provided at each end support and is rotatable about the rotational axes 88 of a sprocket (not shown) used to drive the chain. The drum has a peripheral surface that is surrounded by a resilient sleeve 162. As the pushers depart the guide channel 144 and make the transition from a straight to a curved path, a head 164 on a bolt 166 holding each guide roller 140 in place on the pusher support plate encounters and compresses the resilient sleeve 162. The sleeve 162 urges the pushers radially outwardly and takes up any play that may cause rattling as the conveyor operates.

The foregoing detailed description was made for purposes of demonstrating the structure and operation of the invention, with no unnecessary limitations to be understood therefrom.

I claim:

1. In a sorting conveyor having article carrying tubes mounted in pairs for movement in an endless path in a direction at right angles to the length of the tubes and a guide member, an improved article pusher comprising:
   a slider inside each of the tubes of a pair of tubes for movement lengthwise of the tubes;
   a pusher support interconnecting the sliders inside the pair of tubes;
   an article engaging pusher surface mounted on said support; and
   a pusher actuator mounted on said support for engagement with the guide member to move the pusher laterally as the tubes are moved in said endless path.

2. The article pusher of claim 1 in which the pusher support is below the tubes and the pusher surface is above the tubes.

3. The article pusher of claim 1 in which each tube in the tube pair has an associated lengthwise slot and the pusher support extends through the slot in each tube of the pair of tubes and means connect the pusher support to the sliders, said slots permitting shifting of the article pusher lengthwise of the tubes.

4. The article pusher of claim 1 where each of the tubes has a substantially cylindrical inside surface, and each of the sliders has at least one flat defining a space between the slider and the inside surface of the tubes whereby friction between the sliders and inside tube surface is reduced, said spaces capable of accepting foreign matter and accommodating dents in the tubes that might otherwise impair shifting of the sliders within the tubes.

5. The article pusher of claim 1 wherein each of the tubes has a substantially cylindrical inside surface, and each of the sliders has at least one arc defining a space between the sliders and the inside surface of the tubes whereby friction between the sliders and inside tube surfaces is reduced, said spaces capable of accepting foreign matter and accommodating dents in the tubes that might otherwise impair shifting of the sliders within the tubes.

6. The article pusher of claim 1 wherein each of the tubes in the tube pair has a lengthwise slot, the pusher support comprises a U-shaped bracket, the pusher surface is mounted on the base of the U, and each of the legs of the U extends through one of the tube slots and is connected to one of the sliders.

7. The article pusher of claim 1 wherein an inside surface of each of the tubes defines a hollow within which each slider is guided and said slider is made from a flexible material and has a deflectable portion that engages the inside surface of the tube and prevents binding between the sliders and tubes as relative movement occurs therebetween.

8. The article pusher of claim 1 wherein the article engaging pusher surface is disposed at an angle to the direction of movement of the tube pair.

9. The article pusher of claim 1 wherein each of the tubes in the tube pair has a lengthwise slot, the pusher support comprises a U-shaped bracket, each of the legs of the U extends through one of the tube slots and each said slider comprises first and second parts arranged so that a leg of the U resides between the first and second slider parts.

10. The article pusher of claim 7 wherein the deflectable portion of each slider is bowed radially outwardly with respect to its associated tube.

11. The article pusher of claim 9 wherein an inside surface of each tube defines a hollow within which the sliders can be guidingly moved, the slider parts are made from a flexible material and at least a portion of one of the first and second slider parts must be deflected towards the other of the first and second slider parts to introduce the slider into the tube hollow, said deflected portion of the one of the first and second slider parts contacting the inside tube surface and accounting for smooth guiding of the slider relative to the inside tube surface.

12. A conveyor comprising:
   a plurality of elongate, laterally extending article carrying tubes mounted for movement transverse to the length of the tubes in an endless path;
   a plurality of rollers;
   means mounting the rollers adjacent the ends of the tubes for rotation about substantially horizontal axes;
   a channel for supporting and guiding the rollers for movement of the carrying tubes in said endless path;
   a driven chain loop;
   means on the chain loop for moving the carrying tubes in said endless path,
   said article carrying tubes each having an article bearing surface that extends laterally beyond both said rollers and chain loop; and
   means for discharging articles laterally from said conveyor along said article bearing surfaces over the ends of said tubes,
   whereby said article bearing surface direct laterally discharging articles over the rollers and chain loop so that no contact occurs between discharging articles and the rollers and chain loop.

13. The conveyor of claim 12 wherein said channel guides the rollers adjacent each end of the tubes, means rigidly connect the lateral ends of each tube to an adjacent tube so that the tubes travel in pairs through said endless path, each of the tubes in each said tube pair has an associated bracket, said roller mounting means mount first and second rollers to each of the brackets, said rollers moving in the channels as the conveyor operates, and said article bearing surface extends laterally beyond said brackets.

14. The conveyor of claim 13 wherein each channel has a U-shaped portion in cross-section which opens laterally inwardly, said first and second rollers being guided against one of the legs of the U and confined against vertical movement by the other leg of the U.

15. The conveyor of claim 14 wherein a thrust control member is associated with the bracket and the thrust control member is situated adjacent the base of the U-shaped portion of the channel which confines lateral shifting of the tube pairs.

16. The conveyor of claim 14 wherein the spacing between the axes of the rollers is greater than the chain pitch.

17. In a sorting conveyor having a pair of parallel, driven chain loops, the improvement comprising:
   a plurality of pairs of article carrying tubes;
   means mounting each pair of tubes independently on said chain loops whereby misalignment or stretch of said chains does not skew the tubes within each pair; and
   a laterally movable article pusher mounted on one of said pairs of tubes,
   wherein an article pusher is associated with each tube pair, each said tube in the tube pair has an inside surface defining a hollow, each article pusher has a first slider movable guidingly in one of the hollows in one of the tubes of a tube pair and a second slider movable guidingly in the other of the tube hollows, bracket means interconnect the first and second sliders, an article engaging surface is associated with the bracket means and extends above the tubes and means mount the article pushers for movement guidingly along the length of the tubes.

18. In a conveyor having article carrying tubes mounted in pairs for movement in an endless path consisting of an upper horizontal path portion and a lower horizontal path portion around spaced end supports in a conveying direction at right angles to the length of the tubes and through curved path portions between the upper and lower path portions, a plurality of pushers on the tube pairs and each having a guide element with a head below the tubes and an article engaging surface above the tubes with the pusher in the upper horizontal path portion and guide means for bearing against said guide element and directing each pusher transversely to the conveying direction, said guide means extending along the upper path portion and being interrupted along a length of the curved path portions, the improvement comprising:
   at least one said end support having a cylindrical member that rotates as the conveyor operates,
   said cylindrical member having a resilient, cylindrical outer surface that intersects the path of the guide element heads on the tube pairs moving in one of the first and second curved path portions so that the resilient outer surface is engaged and compressed by the head of the guide element on each pusher as the pushers pass over the cylindrical member through the one of the curved path portions,
   whereby said resilient outer surface supports each pusher portion below the tubes along the length of the one curved path portion so that shifting of the pushers transversely to said conveying direction along the length of the one curved path portion and rattling of the pushers is prevented.

19. The improved conveyor of claim 18 in which said cylindrical member comprises a drum and a resilient sleeve is disposed over the peripheral surface of the drum.

* * * * *